United States Patent [19]

Furuya et al.

[11] Patent Number: 5,321,802

[45] Date of Patent: Jun. 14, 1994

[54] INFORMATION PROCESSING APPARATUS

[75] Inventors: Yoji Furuya, Inagi; Michihei Murayama, Tachikawa; Yoshinori Yamaguchi, Yamato; Kenichiro Sugiura, Funabashi, all of Japan

[73] Assignee: Canon Kabushiki Kaisha, Tokyo, Japan

[21] Appl. No.: 109,111

[22] Filed: Aug. 17, 1993

Related U.S. Application Data

[63] Continuation of Ser. No. 26,206, Mar. 2, 1993, abandoned, which is a continuation of Ser. No. 428,191, Oct. 26, 1989, abandoned.

[30] Foreign Application Priority Data

Oct. 28, 1988 [JP]  Japan ............................ 63-274015

[51] Int. Cl.$^5$ ............................................. G06F 15/62
[52] U.S. Cl. ..................................... 395/146; 395/164
[58] Field of Search ............................. 395/144–148, 395/159, 162, 164; 358/401, 403, 448, 452, 462

[56] References Cited

U.S. PATENT DOCUMENTS

| | | | |
|---|---|---|---|
| 4,506,342 | 3/1985 | Yamamoto | 364/900 |
| 4,587,633 | 5/1986 | Wang et al. | 364/521 X |
| 4,604,653 | 8/1986 | Shimizu | 364/518 X |
| 4,652,933 | 3/1987 | Koshiishi | 358/256 |
| 4,763,356 | 8/1988 | Day, Jr. et al. | 364/900 |
| 4,885,704 | 12/1989 | Takagi et al. | 364/521 |

Primary Examiner—Heather R. Herndon
Attorney, Agent, or Firm—Fitzpatrick, Cella, Harper & Scinto

[57] ABSTRACT

An information processing apparatus for performing a plurality of functions includes an auxiliary memory for receiving document data, a main memory for storing the document data received by the auxiliary memory, and a display for displaying the document data stored in the main memory. Icons for designating various edit operations for the document data displayed on the display. A CPU performs edit processing of the document data stored in the main memory in accordance with designation made by the icons.

31 Claims, 16 Drawing Sheets

INFORMATION PROCESSING APPARATUS

This application is a continuation of application Ser. No. 08/026,206 filed Mar. 2, 1993, now abandoned, which is a continuation of application Ser. No. 07/428,191, filed Oct. 26, 1989, abandoned.

BACKGROUND OF THE INVENTION:

1. Field of the Invention

The present invention relates to a multifunctional information processing apparatus integrally including a telephone set, a facsimile (fax) machine, a personal computer, and the like.

2. Related Background Art

A conventional apparatus integrally including a telephone set, a facsimile machine, a personal computer, and the like is disclosed in commonly-assigned U.S. application Ser. No. 269,733 titled "Multifunctional Information Processing Apparatus" and filed Nov. 10, 1988 by Furuya et al. now abandoned. When the apparatus serves as a fax machine, print output on a roll of sheets is started upon reception of data by the apparatus as in a normal fax machine. However, when the printer cannot be used or a confidential fax is sent, fax data is stored in an auxiliary memory as a file. The details of the above operations are described in FIG. 18 of the above U.S. application.

However, in the above prior art, since all fax documents are printed and output on sheets, (1) an amount of sheets used during reception is greatly increased, (2) even a fax document which is not required to be printed on an output sheet, i.e., which need only be temporarily checked on a screen because this document is not so important, and (3) fax data cannot be preserved or edited on a screen, and edited data cannot be transmitted to other fax machines.

Some "personal computer/fax machines" each integrally including a personal computer and a fax machine can eliminate the above drawbacks (1) to (3). In this case, an apparatus results in a large system because it must be connected to a personal computer, a fax board, a printer, and an image reader. These units are connected through a general purpose interface such as RS232C or centronics. The processing time is inevitably prolonged due to data transfer speeds between the units. The personal computer/fax machine primarily aims at transmitting data such as a word processing document drafted by the personal computer to a destination without outputting it on paper.

SUMMARY OF THE INVENTION

It is a first object of the present invention to provide an information processing apparatus capable of temporarily storing received document data and displaying the stored document data on a display screen, and editing the document data displayed on the display screen.

It is a second object of the present invention to provide an information processing apparatus capable of temporarily storing received document data and displaying the stored document data on a display screen, editing the document data displayed on the display screen, and printing and outputting the edited data.

It is a third object of the present invention to provide an information processing apparatus capable of editing received document data and transmitting the edited document data to a desirable destination.

It is a fourth object of the present invention to provide an information processing apparatus capable of temporarily storing received document data, causing a display screen to display a command icon on the document data display screen, and editing the document data in accordance with the command icon.

DESCRIPTION OF THE PREFERRED EMBODIMENTS

Figure 1:
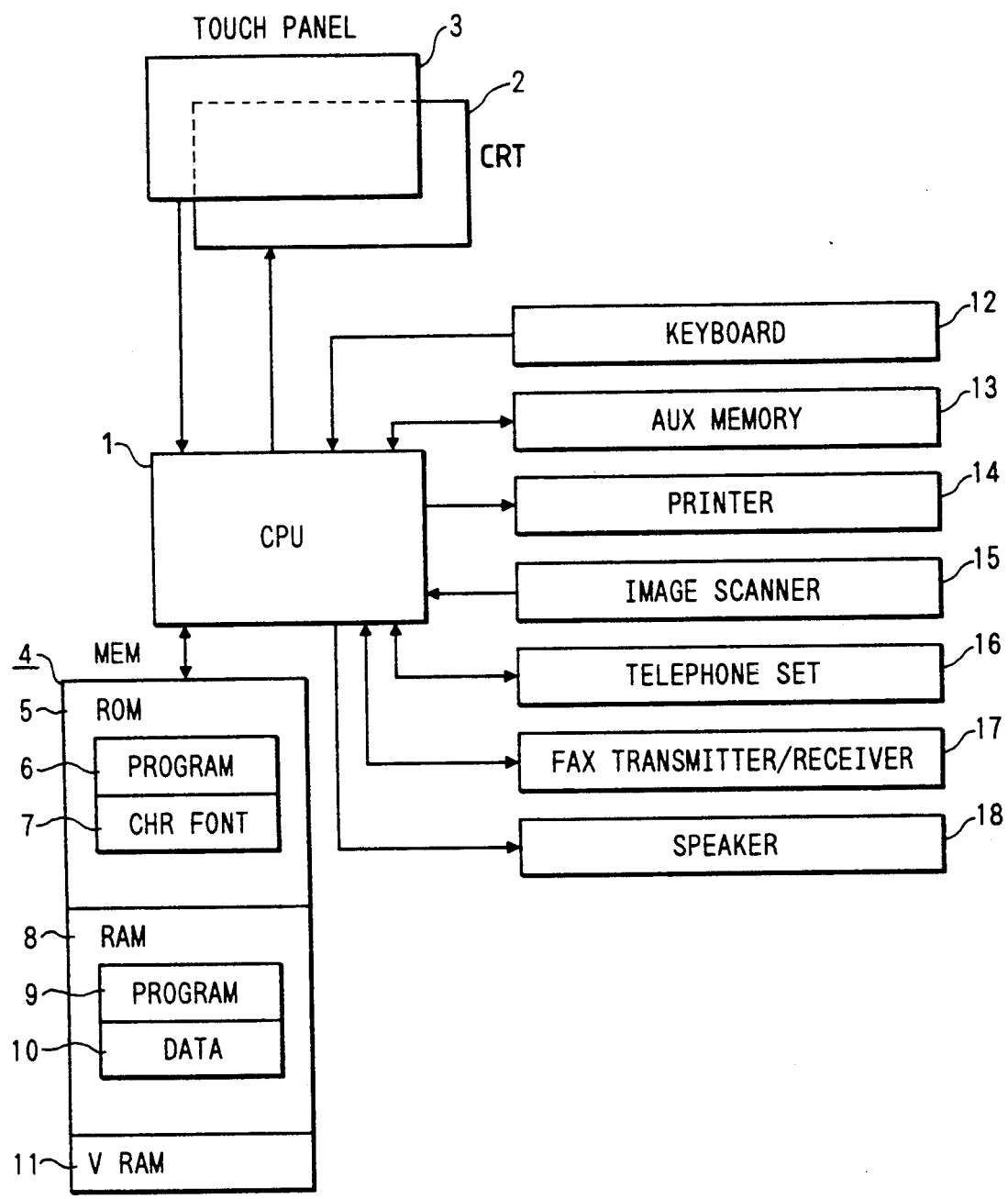
FIG. 1 is a schematic block diagram for explaining an information processing apparatus according to an embodiment of the present invention.

The present invention will be described in detail with reference to preferred embodiments of the present invention. A central processing unit (to be referred to as a CPU hereinafter) 1 controls the overall operations of an information processing apparatus. A touch panel 3 covers the front surface of a CRT display 2. When a user touches with his finger one of the pictorial symbols (to be referred to as icons hereinafter) or a touch panel portion near a button display, the touched icon or button display can be directly designated. A memory 4 consists of a read-only memory (to be referred to as a ROM hereinafter) 5, a random access memory (to be referred to as a RAM hereinafter) 8, and a video RAM (to be referred to as a VRAM hereinafter) 11. ROM programs 6, character fonts 7 to be displayed on the CRT display 2, and the like are stored in the ROM 5. The RAM 8 stores a program 9, program data 10, and the like. A screen image including the character fonts is developed by the VRAM 11, so that the screen image is displayed on the CRT display 2. The CPU 1 is also connected to a keyboard 12 for entering key inputs, an auxiliary memory 13 for storing the program 9, fax received data, and document data received from a wordprocessor, an image scanner 15 for reading an image, a printer 14 for printing outputs, and a telephone set 16. A fax transmitter/receiver 17 and a speaker 18 are further connected to the CPU 1. The telephone set 16 includes a telephone transmitter, a telephone receiver, and a handset. The fax transmitter/receiver 17 mainly processes the transmitting and received signals. The received fax document is printed at the printer 14. The image scanner 15 is used to read a document image for fax transmission. The speaker 18 produces click tones of the keyboard 12, alarm tones, and ringing tones. The printer 14 also prints a word processing document and is used for various printing purposes in addition to printing outputs of fax documents. The printer 14 incorporates a standard paper printer and a roll paper printer which can be selectively used. The image scanner 15 is used to read an image of a fax transmission document and is also used to read image data for an "image editing" function to be described later. The above points are described in detail in the preferred embodiments of the above U.S. application, and a detailed description thereof will be omitted.

Figure 2:
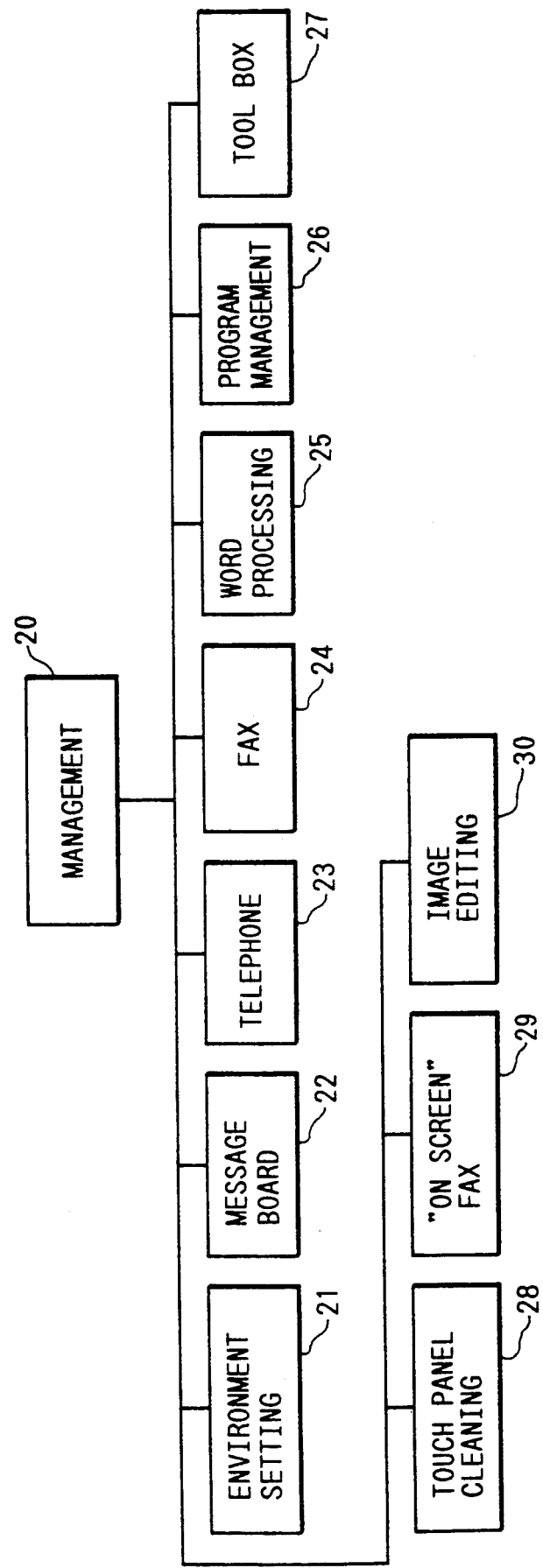
FIG. 2 is a functional block diagram of programs executed in the apparatus shown in FIG. 1.
Figure 3:
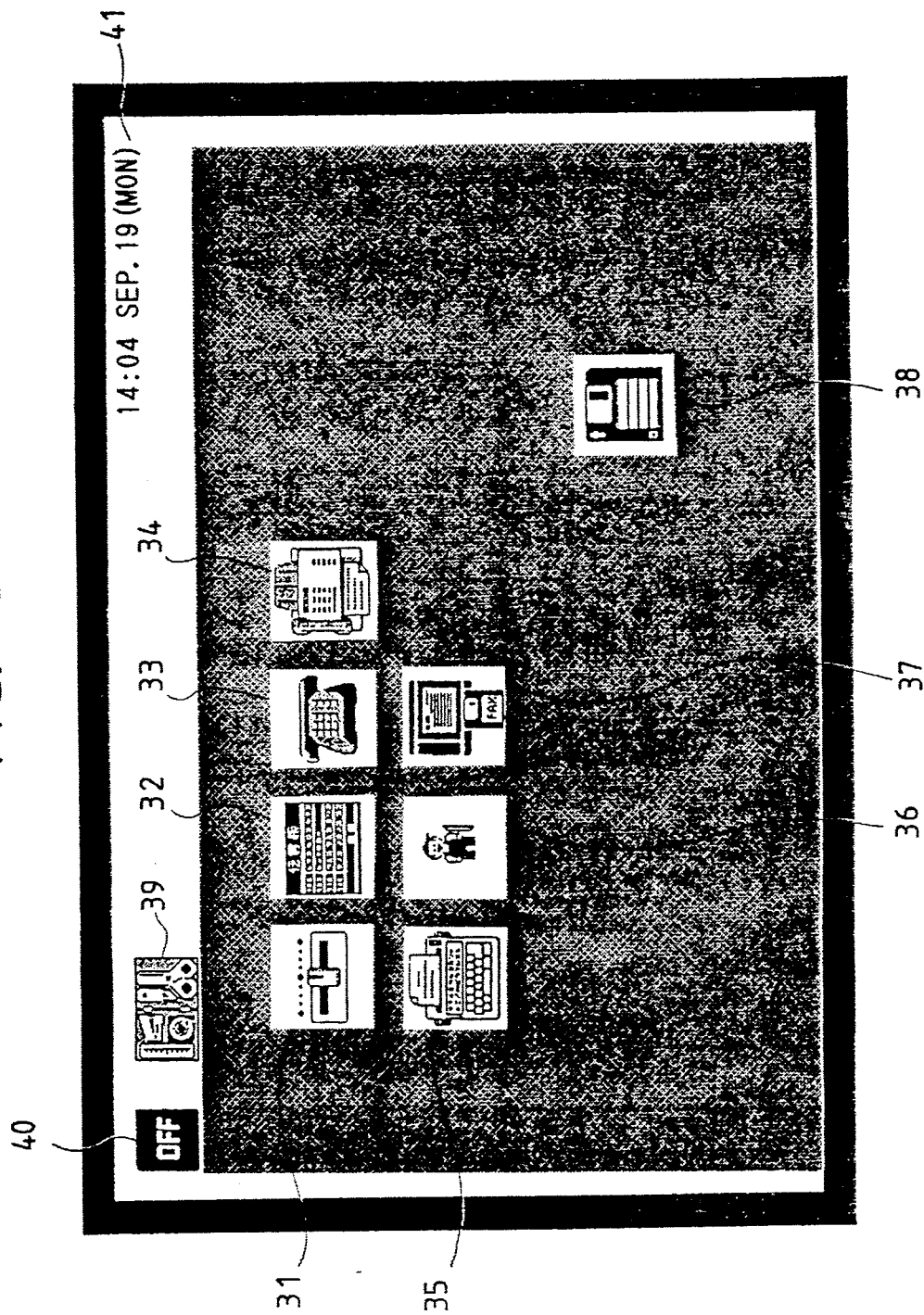
FIG. 3 is a view showing a main menu screen.

FIG. 2 is a functional block diagram for controlling operations of the information processing apparatus. Functions surrounded by rectangles are constituted by independent programs, respectively. The functional block diagram includes a "management" function for controlling all other functions, i.e., an "environment setting" function 21, a "message board" function 22, a "telephone" function 23, a "fax" function 24, a "word processing" function 25, a "program management" function 26, a "tool box" function 27, a "touch panel cleaning" function 28, an "on screen fax" function 29, ; and an "image editing" function 30. The environment setting function 21 is used to set a speaker volume, a telephone number, and the like. The message board function 22 is used to leave a message in the auxiliary memory 13. The program management function 26 is used to load a program from the auxiliary memory 13 to the program area 9 of the RAM 8. The tool box function 27 is used to perform a paste work during creation of a word processing document and delete the program 9 from the RAM 8. The touch panel cleaning function 28 is used to disable reception of a touch signal during cleaning of the touch panel. The "on screen" fax function 29 is a characteristic feature of the present invention and is used to perform printing, conversion into image data, transfer, and data delete after fax received document data is stored in the auxiliary memory 13 and displayed on a screen. The image editing function 30 is used to edit image data. The functions from the management function 20 to the touch panel cleaning function 28 are stored as the ROM programs 6 in the ROM 5 of the memory 4. The "on screen" fax function 29 and the image editing function 30 are stored as RAM programs 9 in the RAM 8. This state indicates that the user loaded the programs from the auxiliary memory 13 to the RAM 8 by using the program management function 26. When the program of the "on screen" fax function 29 is loaded in the RAM 8, the mode of the fax received data is converted into a mode for storing all the fax received data in the auxiliary memory 13 without printing. This reception operation serves as a background routine. Various other application programs are also stored in the auxiliary memory 13. The user can arbitrarily load and set any program in the RAM 8. The functions except for the management function 20 in FIG. 2 are displayed as icons in a main menu on the CRT display 2, as shown in FIG. 3. When the user selectively touches an icon in the main menu through the touch panel 3, the designated function is immediately started. A multitask operation can be performed by the user by means of the management function 20. For example, while the user is creating a word processing document with the word processing function 25, the user can perform automatic fax reception or make a phone call by changing the screen into a telephone screen upon taking up of a handset. The above functions are systematized such that image data read by the image editing function 30 is pasted into a word processing document created by the word processing function 25 so as to obtain common data, or such that a transmission routine of the fax function 24 is called during creation of a word processing document by the word processing function 25 to directly send a word processing document as a fax document so as to obtain a common function. The functions and program execution are described in detail in the embodiments of the above-mentioned U.S. application, and a detailed description thereof will be omitted.

FIG. 3 shows the main menu displayed on the CRT display 2. The main menu includes an "environment display" icon 31, a "message board" icon 32, a "telephone" icon 33, a "fax" icon 34, a "word processing" icon 35, a "touch panel cleaning" icon 36, an "on screen fax" icon 37, a "program management" icon 38, a "tool box" icon 39, and an "end" icon 40. A state in FIG. 3 indicates that an icon corresponding to the image editing function 30 in FIG. 2 is not loaded yet. A date and a message are displayed in a column 41.

Figure 4:
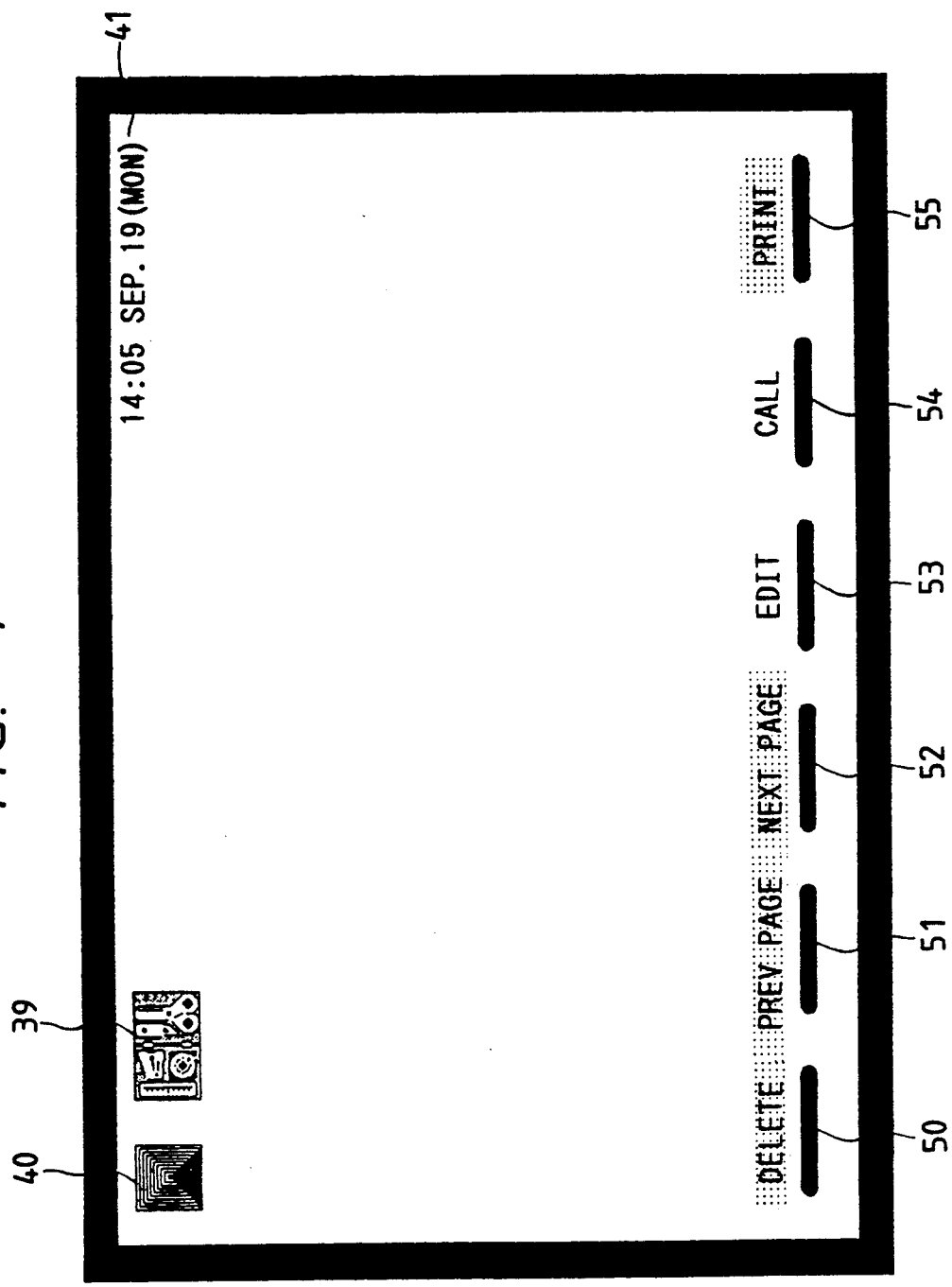
FIG. 4 is a view showing an initial screen of an "on screen" fax function.

FIG. 4 shows a state wherein the "on screen" fax function 29 is started immediately after the user touches the "on screen" fax icon 37, so that the display of the CRT display 2 is changed into an initial screen of the "on screen" fax function 29. The tool box icon 39 and the end icon 40 are also displayed in FIG. 4. The column 41 is used to display a date and a message as in the main menu. In this case, when the user touches the end icon 40, the screen returns to the main menu screen. A "call" button 54 is used to display on a screen a fax document data received and stored in the auxiliary memory 13. A "print" button 55 is used to print and output the fax document displayed on the screen. An "edit" button 53 is used to convert fax document data displayed on the screen into another data to create a new image file. A "next page" button 52 is used to display the next page of the fax document displayed now on the screen. A "previous (prev) page" button 51 is used to display the previous page of the fax document displayed now on the screen. A "delete" button 50 is used to delete a fax document data stored in the auxiliary memory 13 and corresponding to the fax document now on the screen to clear the screen. Any button displays which cannot be used in given operating states are subjected to half-tone dot meshing. For example, since fax document data to be printed is not loaded yet in FIG. 4, the "print" button 55 is displayed with half-tone dot meshing.

Figure 5:
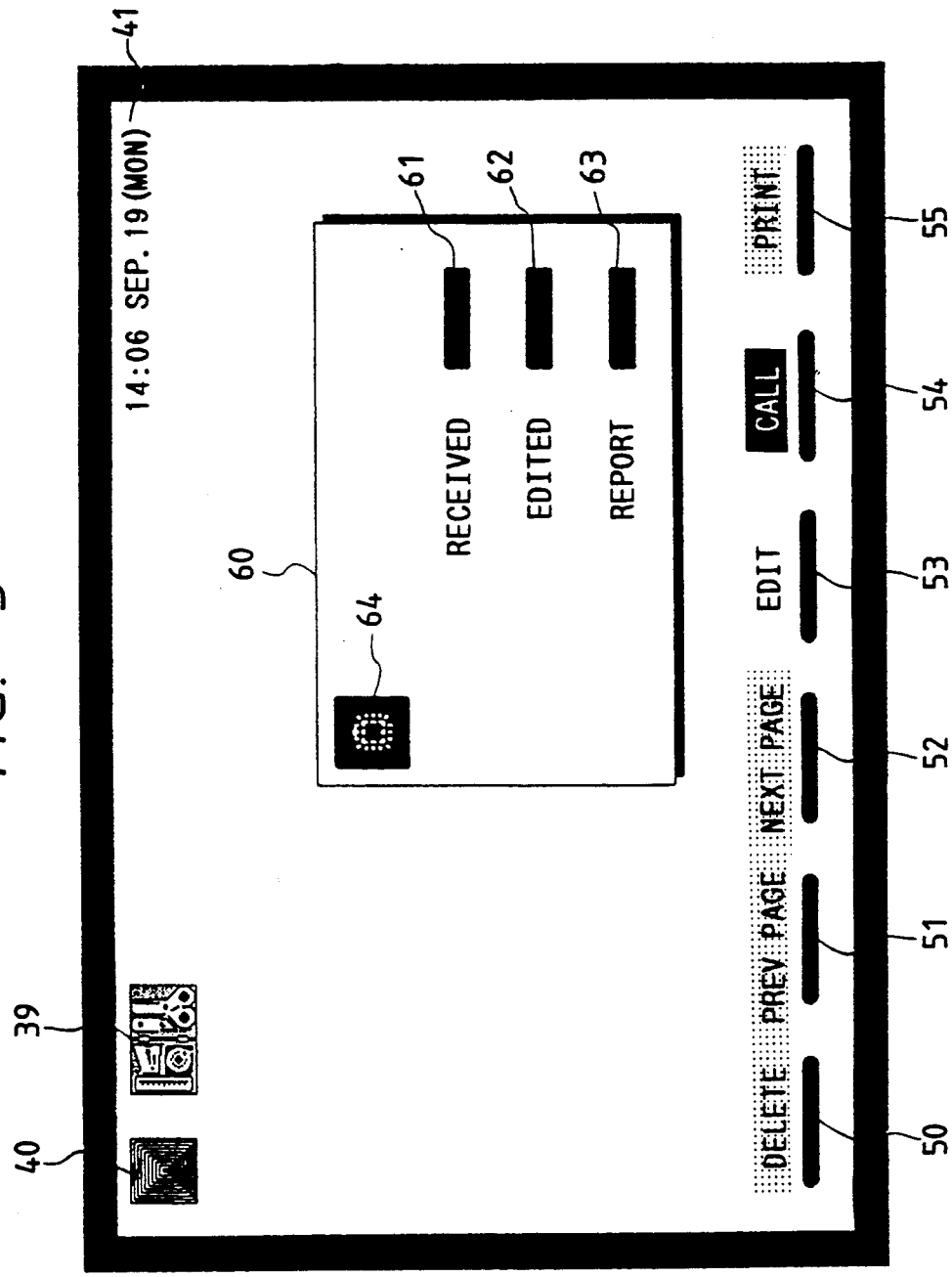
FIG. 5 is a view showing a "call" window screen.

FIG. 5 shows a state wherein a "call" window 60 is open immediately after the user touches the call button 54 in FIG. 4. In this case, a "received" button 61 is used to display a fax received document on the screen. An "edited" button 62 is used to display an image data file received by the image editing function 30. A "report" button 63 is used to display a communication management report of fax reception on the screen. FIG. 5 shows a state wherein either fax received data or image data can be called on the screen, and then the called data can be processed as the same type of data as the noncalled data. An "end" button 64 is used for a "call" window. When the user touches the "end" button 64, the "call" window 60 is closed.

Figure 6:
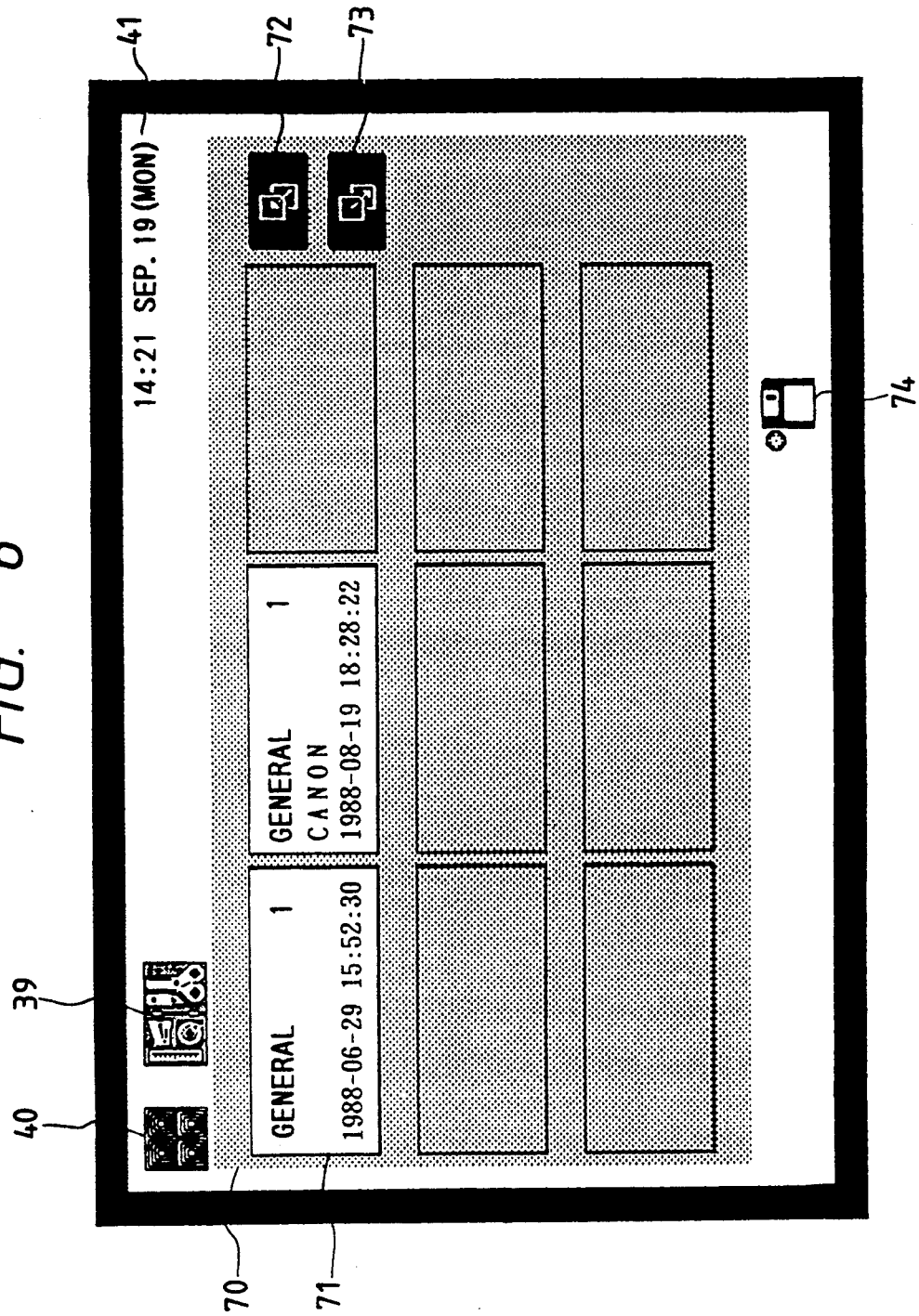
FIG. 6 is a view showing a fax received document list screen.

FIG. 6 shows a list 70 of fax received documents, which list is displayed when the user touches the "received" button 61 within the "call" window 60 of FIG. 5. One of the documents included in the list 70 is represented by 71. The memory contents of the list represent a general or confidential document, the number of received documents, a transmission source, a reception date, and the like. A "next page" button 73 for the list and a "previous page" button 72 for the list are used when the number of received documents is larger than 9, and all the received documents cannot be displayed on one screen page. A message 74 represents that the auxiliary memory 13 is a floppy disk drive and the inserted floppy disk is a start disk of the apparatus. When the user touches the end icon 40, the "call" window is opened, as shown in FIG. 5.

Figure 7:
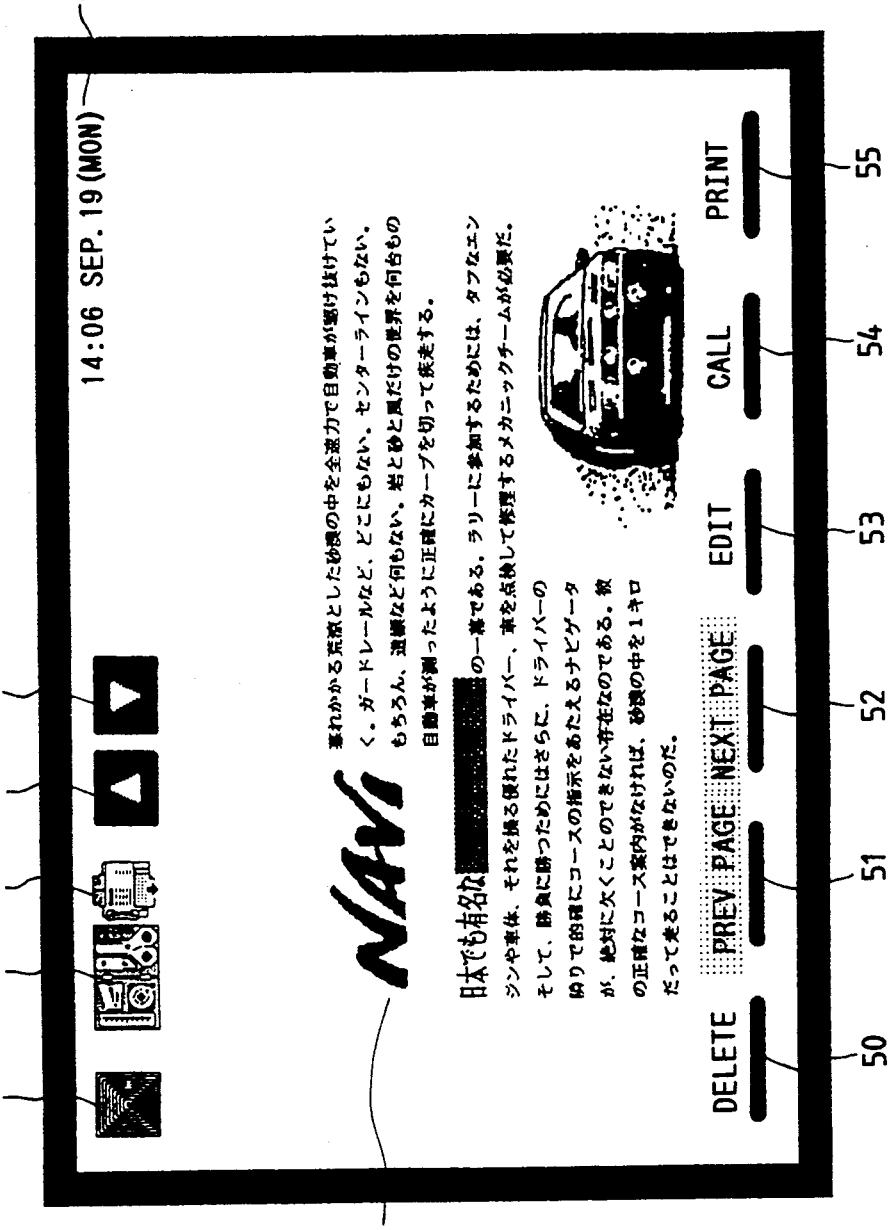
FIG. 7 is a view showing a fax document display screen.

FIG. 7 shows a state wherein fax document data corresponding to the touched one of the received documents 71 of the fax document list in FIG. 6 is loaded and the loaded document is displayed on the screen. This document has a content 80. A mark 81 represents that the operation is associated with the fax. The user edits the document using an "upward" button 82 and a "downward" button 83 for the screen display. The "upward" and "downward" buttons 82 and 83 are used to slightly scroll the screen upward and downward, respectively. The "previous page" and "next page" buttons 51 and 52 change the display contents in units of pages. The "previous page" and "next page" buttons 51 and 52 are displayed with half-tone dot meshing because the displayed document data has only one page.

Figure 8:
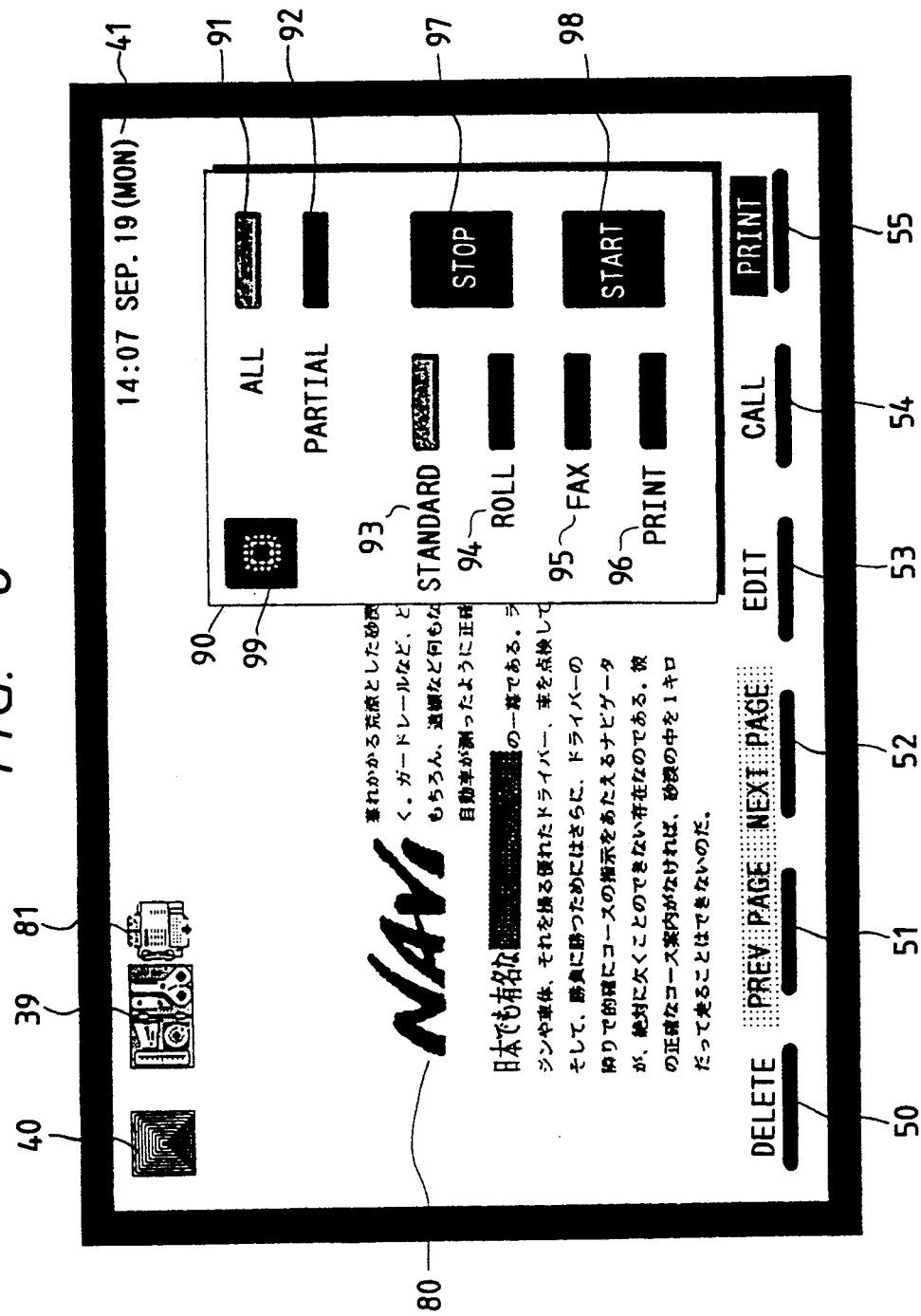
FIG. 8 is a view showing a "print" window screen.

FIG. 8 shows a screen display state wherein a "print" window 90 is open immediately after the user touches the "print" button 55 from the state of FIG. 7. An "all" button 91 is used to output all pages of the fax document now on the screen. A "partial" button 92 is used to output a specific page of the fax document now on the screen. A "standard" button 93 is used to print the document at the standard paper printer. A "roll" button 94 is used to output the document at the roll paper printer. A "fax" button 95 is used to transmit a document to a transmission destination designated by the user instead of printing the document at the printer. A "print" button 96 is used to print and output the document in the background routine. A "start" button 98 and a "stop" button 97 are also displayed. An "end" button 99 is used to close the "print" window 90 without starting the output operation. When the user touches the "print" button 96 and then the "start" button 98, background printing is started, and the "print" window 90 is automatically closed. Thereafter, the user can perform another operation even during printing. In the above description, only the fax document data is output. However, image data called and displayed by the "call" button 54 can also be printed and output or subjected to fax transmission.

Figure 9:
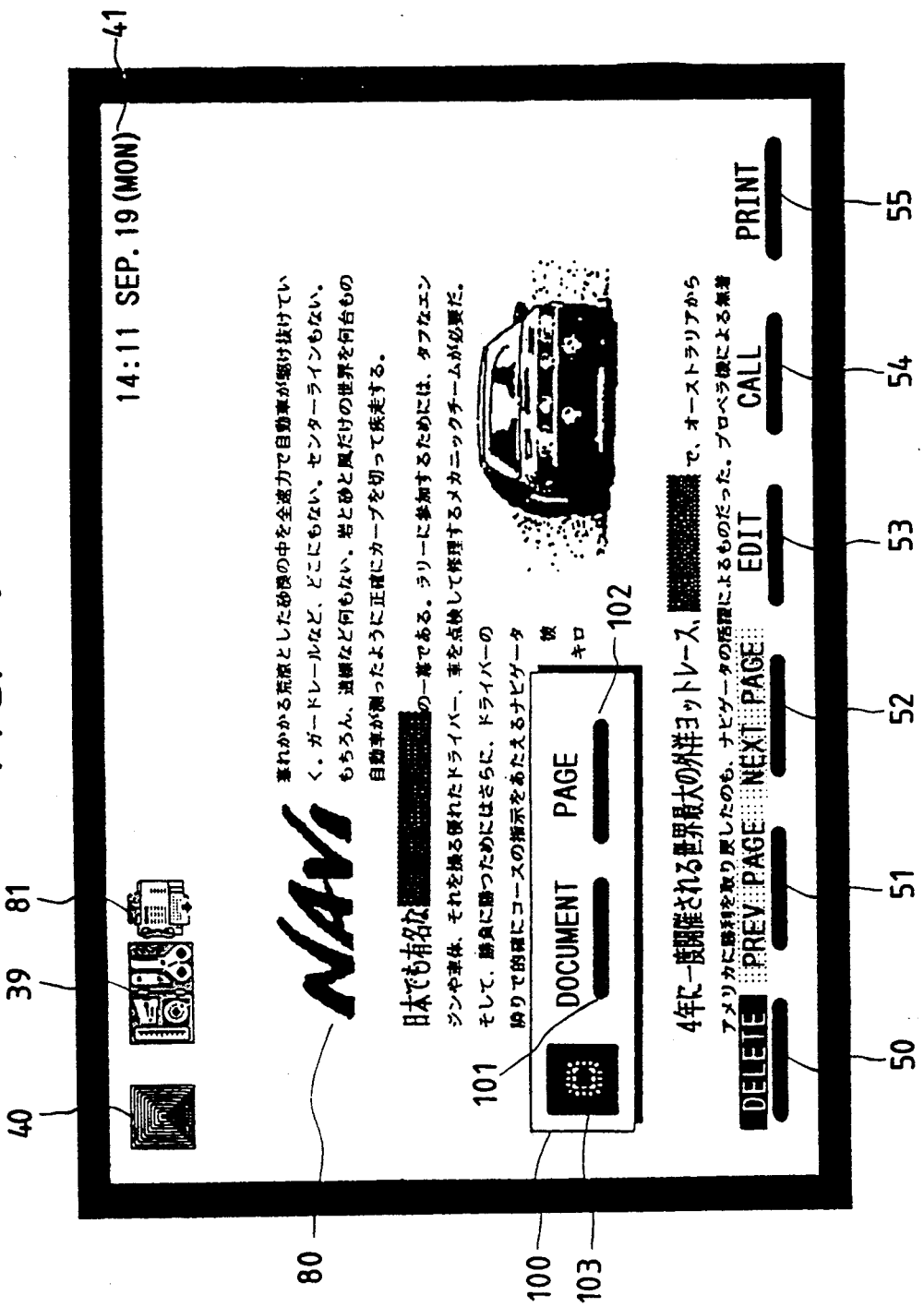
FIG. 9 is a view showing a "delete" window screen.

FIG. 9 shows a state wherein the user checks the fax document now on the screen in the state of FIG. 7, determines that the displayed document is unnecessary, and touches the "delete" button 50, thereby opening a "delete" window 100. A "document" button 101 is used to erase fax document data from the auxiliary memory 13 which corresponds to the fax document now on the screen, and also clears the screen display. A "page" button 102 is used to delete a specific page designated by the user from the fax document now on the screen, and also clears the display of the specific page from the screen display. An "end" button 103 is used to close the "delete" window 100 without executing deletion.

When the user judges that all jobs by the "on screen" fax function 29 are completed, he depresses the "end" button 40 to restore the main menu shown in FIG. 3. All the jobs have been completed.

Operations of the above embodiment will be described with reference to FIGS. 10(a) to 13. However, all operations except for the "on screen" fax function 29 shown in FIG. 2 are described in detail in the flow charts of the embodiments of the above-mentioned U.S. application, and a detailed description thereof will be omitted. Only the "on screen" fax function 29 associated with the present invention will be described with reference to the flow charts.

Figure 10A:
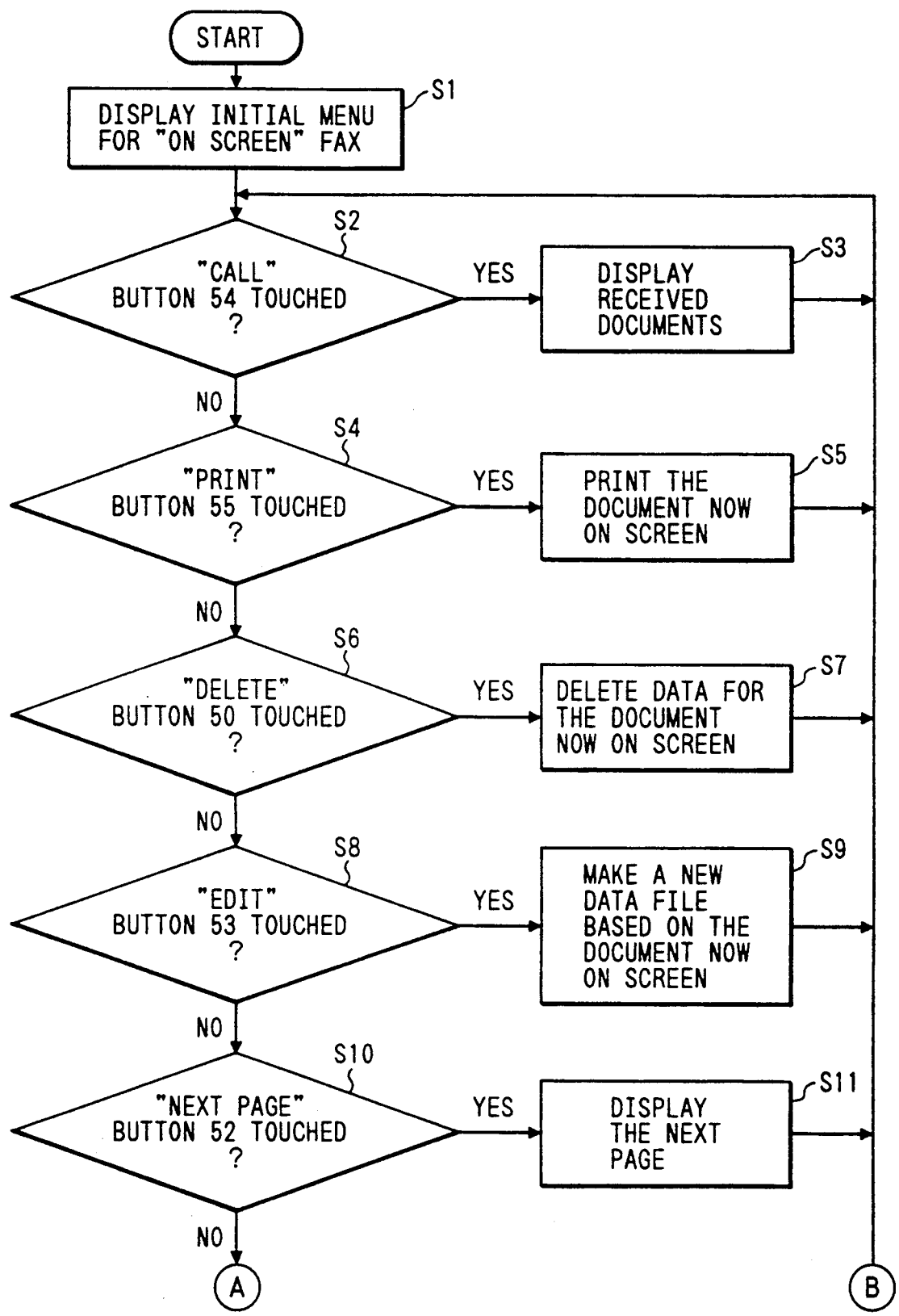
FIGS. 10A and 10B are flow charts for explaining an overall operation of the "on screen" fax.
Figure 10B:
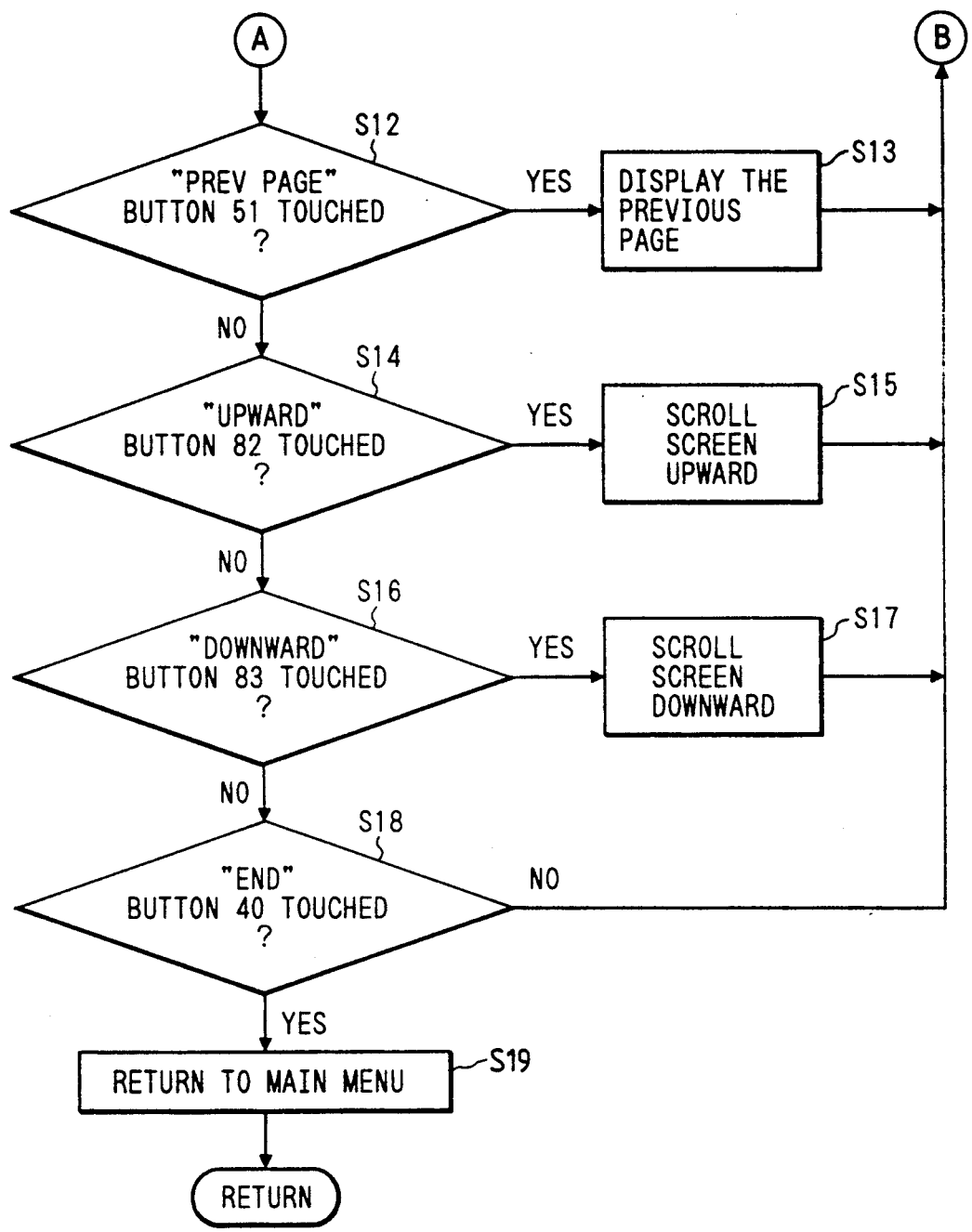

FIGS. 10A and 10B show operations when the user touches the "delete" button 50, the "previous page" button 51, the "next page" button 52, the "edit" button 53, the "call" button 54, the "print" button 55, the "upward" button 82, the "downward" button 83, and the "end" button 40 in the state of FIG. 7. When the user touches the "on screen" fax icon 37 of the main menu, the initial screen of the "on screen" fax function 29 is displayed in step S1. This display screen corresponds to that in FIG. 4. The CPU 1 determines in step S2 whether the user touches the "call" button 54. If YES in step S2, received fax document data in the auxiliary memory 13 is called and displayed on the screen in step S3. The flow then returns to step S2 to form a loop. However, if NO in step S2, the flow advances to step S4 to check whether the user touches the "print" button 55. If YES in step S4, the flow advances to step S5 to print the fax document now on the screen. The flow then returns to step S2. If the "print button" is displayed with half-tone dot meshing and cannot be used at present, the input cannot be accepted. No operation is performed in step S5, and the flow directly returns to step S2. If NO in step S4, the flow advances to step S6 to check whether the user touches the "delete" button 50. If YES in step S6, the flow advances to step S7 to delete the fax received data of the auxiliary memory 13 which corresponds to the fax document now on screen and at the same time to clear the screen display. The flow then returns to step S2. When the "delete" button 50 is displayed with half-tone dot meshing because, e.g., there is no fax document now on the screen, no operation is performed in step S7, and the flow directly returns to step S2. If NO in step S6, the flow advances to step S8 to check whether the user touches the "edit" button 53. If YES in step S8, a new image data file is created from the fax document data now on the screen in step S9, and the flow returns to step S2. If NO in step S8, the flow advances to step S10 to check whether the user touches the "next page" button. If YES in step S10, the page next to the page of the fax document now on the screen is displayed in step S11, and the flow returns to step S2. If NO in step S10, the flow advances to step S12 to check whether the user touches the "previous page" button. If YES in step S12, the previous page of the page of the fax document now on the screen is displayed in step S13, and the flow returns to step S2. If the "previous page" button 51 or the "next page" button 52 is displayed with half-tone dot meshing because the fox document data is one-page data or the like, no operation is performed in step S13 or S11, and the flow returns to step S2. However, if NO in step S12, the flow advances to step S14 to check whether the user touches the "upward" button 82. If YES in step S14, document data of a portion upon scrolling of the same page by 1/10 the screen size upward is displayed on the same page of the fax document now on the screen in step S15. The flow then returns to step S2. If NO in step S14, the flow advances to step S16 to check whether the user touches the "downward" button 83. If YES in step S16, fax document data of a portion upon scrolling of the same page by 1/10 the screen size downward is displayed on the same page in step S17, and the flow returns to step S2. The "upward" button 82 and the "downward" button 83 appear in the state of FIG. 7 upon completion of a call of the fax document. These buttons disappear at other timings, and the user cannot touch these buttons. In this case, the operations are not performed in steps S14 and S16, and the flow advances to step S18. If NO in step S16 while the "downward" button 83 is kept displayed, the flow advances to step S18. The CPU 1 checks in step S18 whether the user touches the "end" button 40. If NO in step S18, the flow returns to step S2 to form a loop. Otherwise, the flow advances to step S19 to change the screen display to the main menu, thereby completing this routine.

Figure 11A:
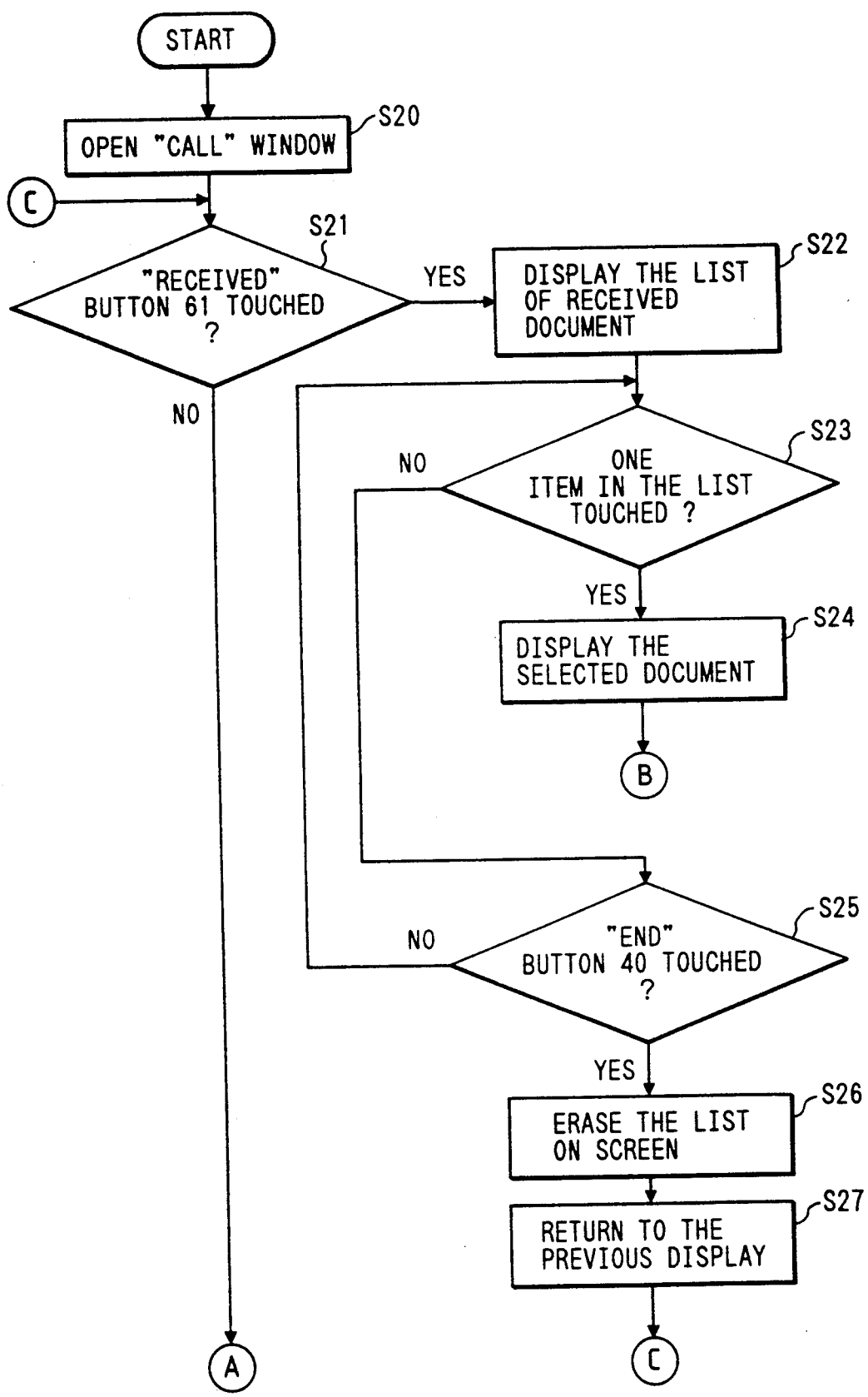
FIGS. 11A and 11B are flow charts for explaining a call operation.
Figure 11B:
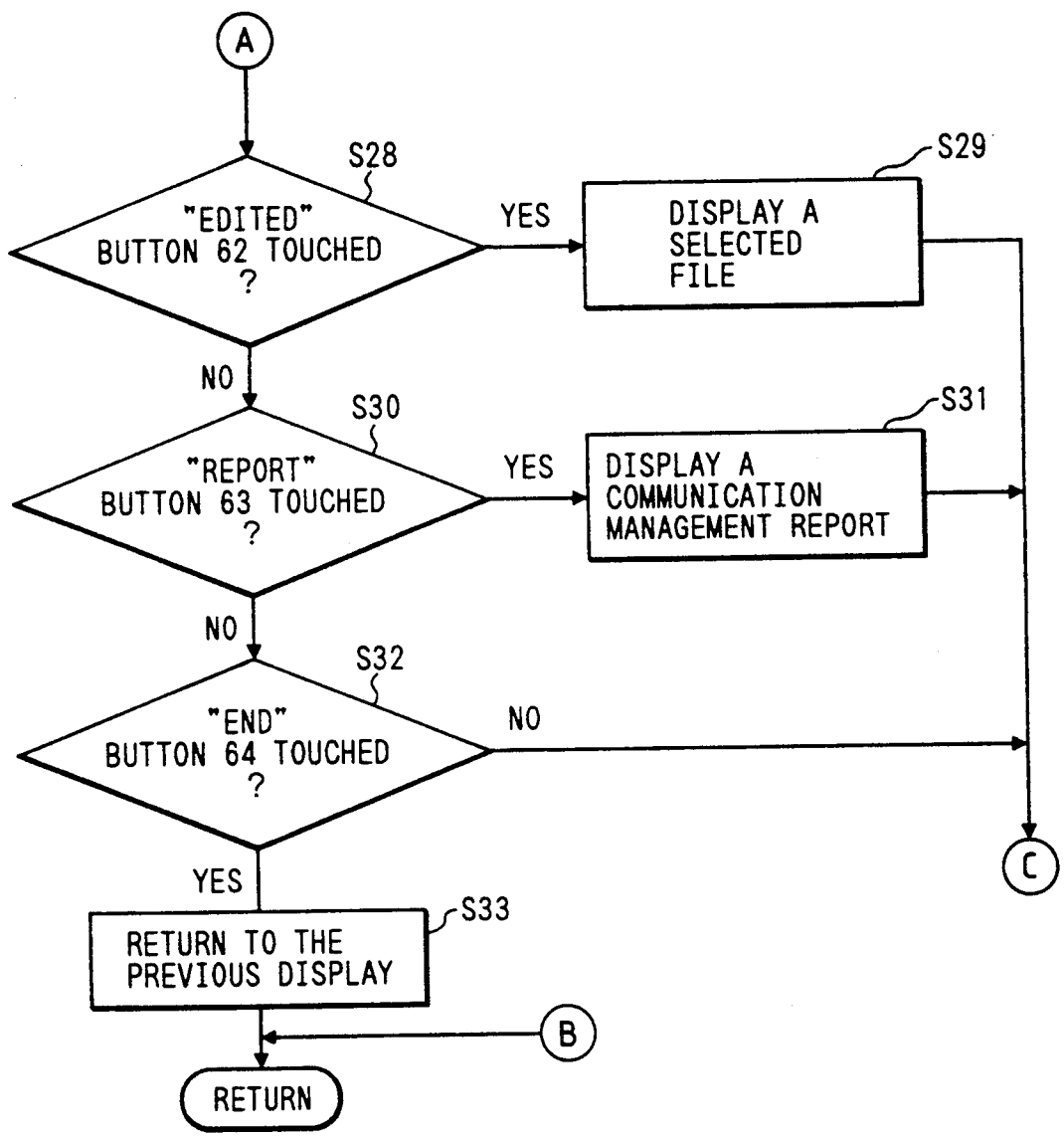

FIGS. 11A and 11B are flow charts for explaining an operation for calling and displaying fax document data on the screen. More specifically, the user touches the "call" button 54 in the screen display state of FIG. 4 to open the "call" window 60 shown in FIG. 5, and then the user causes to display the list of fax received documents shown in FIG. 6 and to display the fax document shown in FIG. 7. When the user touches the "call" button 54, the flow enters in step S20 to open the "call" window 60. The CPU 1 checks in step S21 whether the "user" touches the "received" button 61 within the window. If YES in step S21, the list of received documents stored in the auxiliary memory 13 is displayed on the screen in step S22. The list includes reception dates and times, transmission sources, the numbers of documents, distinctions between normal and confidential documents, and the like. The flow then advances to step S23 to check whether the user touches one of the fax document of the list. If YES in step S23, fax data of the touched or selected fax document is displayed on the screen in step S24, and this routine is ended. However, if NO in step S23, the flow advances to step S25 to check whether the user touches the "end" button 40 during the display of the list. If NO in step S25, the flow returns to step S23 to form a loop. However, if YES in step S25, the list of fax documents is erased in step S26 to restore the previous state prior to the display of fax documents on the screen in step S27. The flow returns to step S21 to form a loop. If NO in step S21, the flow advances to step S28 to check whether the user touches the "edited" button 62. If YES in step S28, the content of the image data file selected by the user is displayed in step S29. That is, the image data file is called on the screen instead of the fax received document. The subsequent operations such as printing can be performed without distinguishing the fax document from the image data. When the operation in step S29 is ended, the flow returns to step S21. If NO in step S28, the flow advances to step S30 to check whether the user touches the "report" button 63. If YES in step S30, the communication management report of the received fax documents is displayed on the screen in step S31, and the flow then returns to step S21. However, if NO in step S30, the flow advances to step S32 to determine whether the user touches the "end" button 64 of the "call" window 60. If NO in step S32, the flow returns to step S21 to form a loop. However, if YES in step S32, the screen display is changed to the state before the user touched the "call" button 54, in step S33. This routine is thus ended.

Figure 12A:
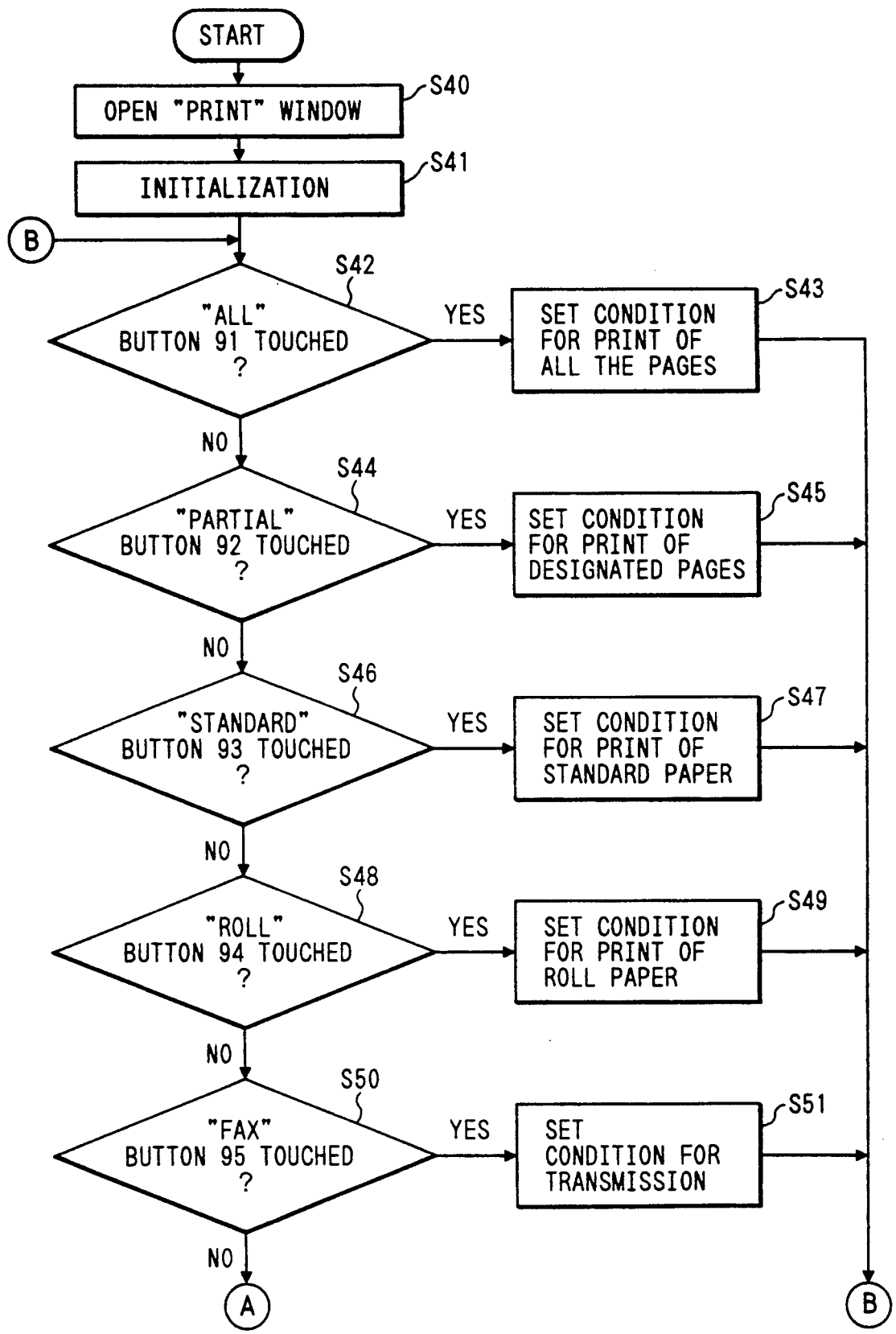
FIGS. 12A and 12B are flow charts for explaining a printing operation.
Figure 12B:
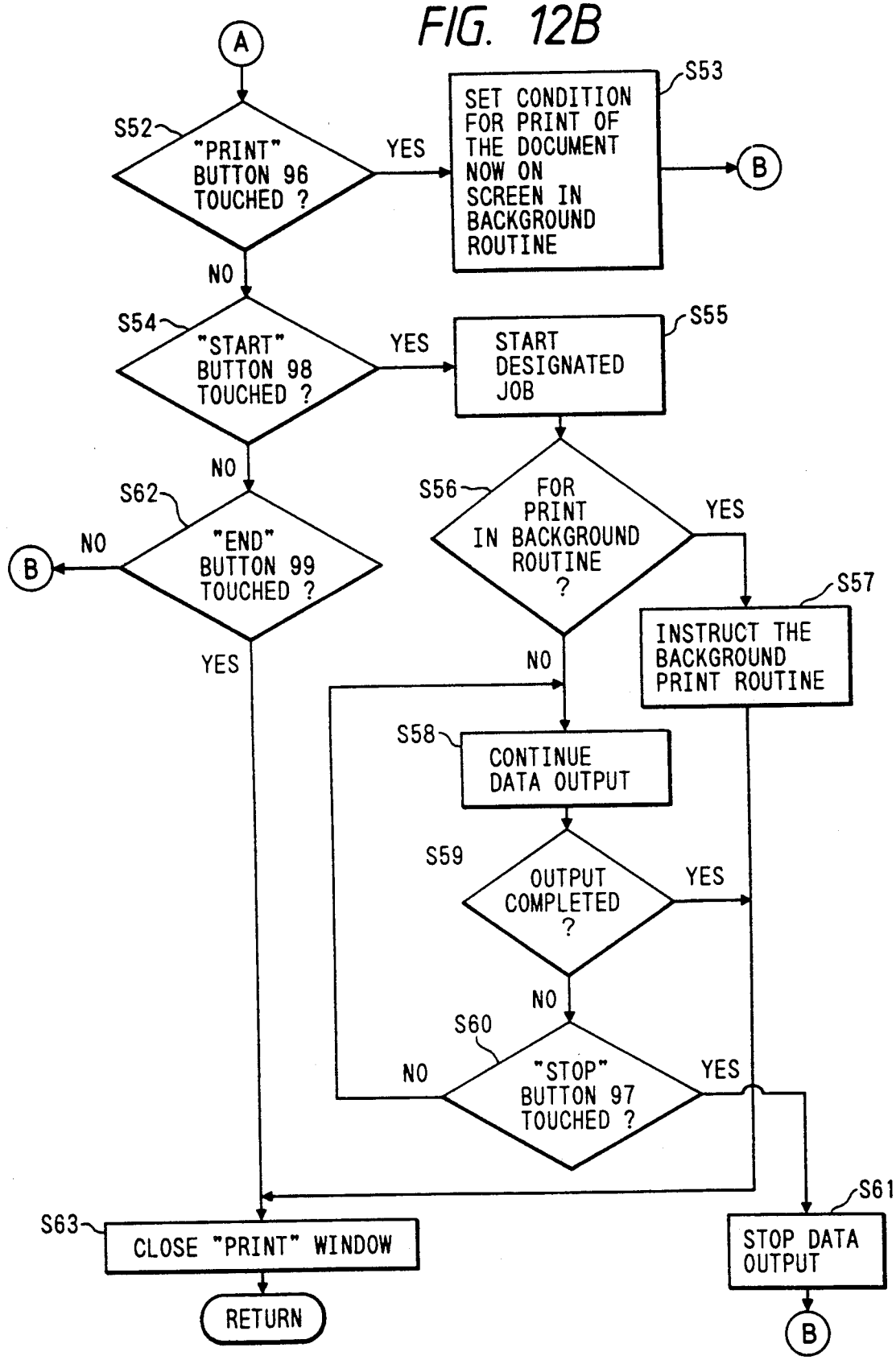

FIGS. 12A and 12B are flow charts for explaining printing and the like of the fax document data. More specifically, FIGS. 12(a) and 12(b) show operations wherein the "print" window 90 is open, as shown in FIG. 8 from the state of FIG. 7 which illustrates the fax document displayed on the screen, and the fax document data is printed. When the user touches the "print" button 55, the flow enters step S40 to open the "print" window 90. In step S41, the initialization of the "print" window 90 is performed to set such that all pages of the fax document now on the screen are subjected to printing at the standard paper printer. The flow then advances to step S42 to check whether the user touches the "all" button 91. If YES in step S42, the output of all the pages of the fax document now on the screen is set in step S43, and the flow returns to step S42 to form a loop. However, if NO in step S42, the flow advances to step S44 to check whether the user touches the "partial" button 92. If YES in step S44, a specific page designated by the user from the pages of the fax document now on the screen is set in step S45, and the flow returns to step S42. If NO in step S44, the flow advances to step S46 to check whether the user touches the "standard" button 93. If YES in step S46, the fax document now on the screen is output and printed at the standard paper printer in step S47, and the flow returns to step S42. If NO in step S46, the flow advances to step S48 to determine whether the user touches the "roll" button 94. If YES in step S48, the fax document now on the screen is set to be output and printed at the roll paper printer in step S49. The flow returns to step S42. If NO in step S48, the flow advances to step S50 to determine whether the user touches the "fax" button 95. If YES in step S50, the fax document now on the screen is transmitted to a destination designated by the user instead of outputting and printing the fax document now on the screen in step S51. The flow then returns to step S42. In this case, even if image data instead of the fax document is now on the screen, fax transmission and printing can be set. However, if NO in step S50, the flow advances to step S52 to determine whether the user touches the "print" button 96. If YES in step S52, the fax document now on the screen is set to be output and printed in the background routine in step S53. The flow then returns to step S42. However, if NO in step S52, the flow advances to step S54 to determine whether the user touches the "start" button 98. If YES in step S54, the document is output and printed at the printer, transmitted as a fax document, or printed in the background mode in accordance with the setup operations in step S55. The CPU 1 determines in step S56 whether printing in the background mode is set. If YES in step S56, printing is instructed to the printing routine of the background mode in step S57 to create a background print data file. The flow then advances to step S63 to close the "print" window 90, and this routine is ended. However, if NO in step S56, the document is continuously output and printed at the printer or transmitted as a fax document in step S58. The CPU 1 determines in step S59 whether the output operation is completed. If YES in step S59, the flow advances to step S63 to close the "print" window 90, and this routine is ended. However if NO in step S59, the flow advances to step S60 to determine whether the user touches the "stop" button 97. If NO in step S60, the flow returns to step S58 to form a loop, and the output operation continues. However, if YES in step S60, output stop processing is performed in step S61, and the flow returns to step S42 to form a loop. If NO in step S54, the flow advances to step S62 to determine whether the user touches the "end" button 99 of the "print" window 90. If NO in step S62, the flow returns to step S42 to form a loop. However, if YES in step S62, the "print" window 90 is closed in step S63, and this routine is ended.

Figure 13:
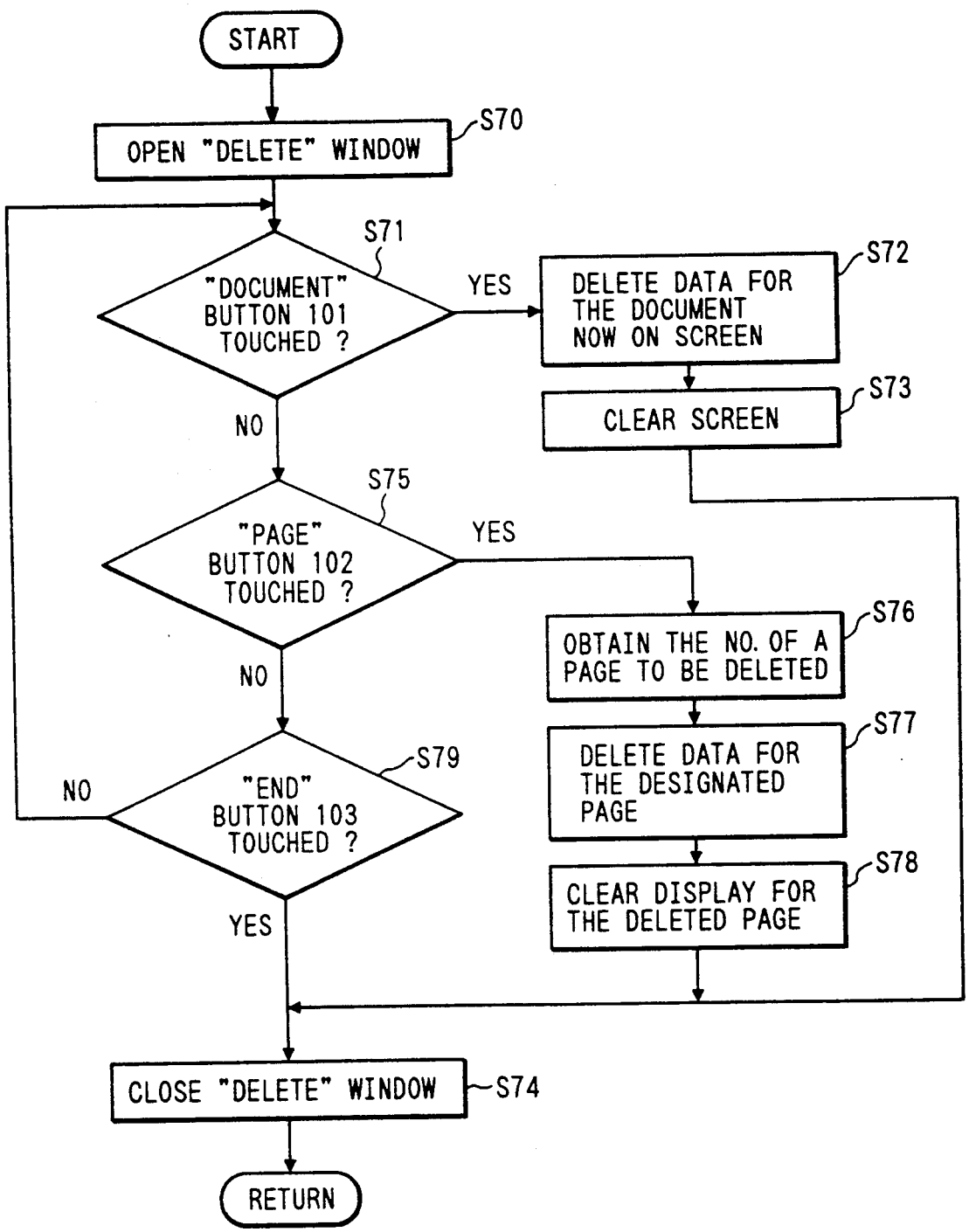
FIG. 13 is a flow chart for explaining a delete operation.

FIG. 13 is a flow chart for explaining a routine for deleting fax document data. More specifically, FIG. 13 explains operations wherein the user touches the "delete" button 50 from the screen display state of FIG. 7 to open the "delete" window 100 shown in FIG. 9, and the fax document data is deleted in this state. When the user touches the "delete" button 50, the flow enters step S70 to open the "delete" window 100. The CPU 1 determines in step S71 whether the user depresses the "document" button 101. If YES in step S71, fax data corresponding to the fax document now on the screen is erased from the auxiliary memory 13 in step S72. The screen is cleared in step S73, and the "delete" window 100 is closed in step S74. This routine is then ended. However, if NO in step S71, the flow advances to step S75 to determine whether the user touches the "page" button 102. If YES in step S75, the number of a page to be deleted is set by the user in step S76. The page data of the fax data which is designated by the user and is now on the screen is erased from the auxiliary memory 13 in step S77. At the same time, the screen display portion of the deleted page is cleared in step S78. The flow advances to step S74 to close the delete window 100, and this routine is ended. However, if NO in step S75, the flow advances to step S79 to determine whether the user touches the "end" button 103 of the "delete" window 100. If NO in step S79, the flow returns to step S71 to form a loop. However, if YES in step S79, the "delete" window 100 is closed in step S74, and this routine is ended.

The "on screen" fax function 29 is executed and processed in accordance with the flow charts in FIGS. 10A to 13.

In the above embodiment, the fax documents are displayed on the screen in a one-to-one size. However, if the previous page of the fax document is displayed in a reduced size, the user can check the entire fax document. In addition, if there is available an implementation wherein the user points out a part of the document displayed in a reduced size and the pointed portion is displayed in an enlarged or one-to-one size, the user can check the details of the document portion.

In the above embodiment, the display screen is scrolled using the "next page" button, the "previous page" button, the "upward" button, and the "downward" button. However, an automatic scroll display function can be added to the apparatus. During automatic scrolling, the user does not touch any button and concentrates himself on the screen to read the displayed contents.

In addition, in the above embodiment, the delete function for deleting pages of the fax document data is available as an edit function. However, an OCR (Optical Character Reader) may be incorporated to perform sentence editing such as changes in characters.

As has been described above, in the information processing apparatus of the present invention, the received fax document data are stored in the auxiliary memory, and the user displays the fax document data on the screen at any time. After the user checks the content of the received fax document, printing, data deletion, image editing, or transfer can be performed. A fax document which is not so important can be deleted without printing once it is checked on the screen. Therefore, waste of fax paper and flooding of information can be prevented. Image editing can be performed on the basis of the fax document data stored in the auxiliary memory to transfer a new document, as needed.

Since the apparatus has a unit configuration, it can be made more compact than the so-called "personal computer/fax machine". In addition, the apparatus of the present invention can perform high-speed operations since the components are not connected through general purpose interfaces, unlike the "personal computer/fax machine".

What is claimed is:

1. An information processing apparatus to which a detachable external memory apparatus is connected, comprising:
   means for receiving facsimile compatible document data;
   memory control means for controlling the external memory apparatus such that the document data received by said receiving means is stored in the external memory apparatus;
   display control means for controlling a display such that the document data stored in the external memory apparatus is displayed on the display;
   means for designating various operation icons displayed on the display, the operation icons representing instructions including an edit instruction, a delete instruction and a print instruction; and
   processing means for performing processing of the facsimile compatible document data stored in the external memory apparatus in accordance with each of the various operation icons designated by said designating means.

2. An apparatus according to claim 1, further comprising means for instructing the display to display the document data stored in the external memory apparatus.

3. An apparatus according to claim 2, wherein said designating means comprises a touch panel arranged on a front surface of a display screen on the display for designating command icons displayed on the display.

4. An apparatus according to claim 1, further comprising means for printing the document data stored in the external memory apparatus.

5. An apparatus according to claim 4, further comprising print instructing means for sending a printing instruction to said printing means.

6. An apparatus according to claim 5, wherein said print instructing means comprises a transparent touch panel arranged on a front surface of a display screen of the display to designate command icons displayed on the display.

7. An apparatus according to claim 1, wherein said designating means comprises a transparent touch panel arranged on a front surface of a display screen of the display, said touch panel being arranged to specify command icons for the various editing operations, said command icons being displayed on the display.

8. An apparatus according to claim 1, further comprising means for managing individual received document data stored in the external memory apparatus.

9. An information processing apparatus, comprising:
   means for receiving facsimile compatible document data from an apparatus;
   memory means for storing the document data received by said receiving means;

display control means for controlling a display such that the document data stored in said memory means is displayed on the display;

means for designating various edit operation icons displayed on the display; and edit processing means for performing edit processing of the document data stored in said memory means in accordance with the edit operation icon designated by said designating means.

10. An apparatus according to claim 9, further comprising means for instructing the display to display the document data stored in said memory means.

11. An apparatus according to claim 10, wherein said designating means comprises a touch panel arranged on a front surface of a display screen of the display to designate command icons displayed on the display.

12. An apparatus according to claim 9, further comprising means for printing the document data stored in said memory means.

13. An apparatus according to claim 12, further comprising print instructing means for sending a printing instruction to said printing means.

14. An apparatus according to claim 13, wherein said print instructing means comprises a transparent touch panel arranged on a front surface of a display screen of the display to designate command icons displayed on the display.

15. An apparatus according to claim 9, wherein said designating means comprises a transparent touch panel arranged on a front surface of a display screen of the display, said touch panel being arranged to specify command icons for the various editing operations, said command icons being displayed on the display.

16. An apparatus according to claim 9, further comprising means for managing individually received document data stored in said memory means.

17. A method for processing data in an apparatus to which a detachable external memory apparatus is connected, comprising the steps of:

receiving facsimile compatible document data;

storing the received document data in the external memory apparatus;

displaying the stored document data on a display;

designating various operation icons displayed on the display, one of the operation icons representing a print instruction which can be executed either in an all data print mode or in a partial data print mode; and print processing the document data stored in the external memory apparatus in the all data print mode or in the partial data print mode in accordance with the print instruction icon designated during said designating step.

18. A method according to claim 17, further comprising a step of instructing the display to display the document data stored in the external memory apparatus.

19. A method according to claim 17, further comprising a step of printing the document data stored in the external memory apparatus.

20. A method for processing information comprising the steps of:

receiving facsimile compatible document data from an apparatus;

storing the received document data;

displaying the stored document data on a display;

designating various edit operation icons displayed on the display; and edit processing the document data stored during said storing step in accordance with the edit operation icon designated during said designating step.

21. A method according to claim 20, further comprising a step of instructing the display to display the document data stored during said storing step.

22. A method according to claim 20, further comprising a step of printing the document data stored during said storing step.

23. An information processing apparatus to which a detachable external memory apparatus is connected comprising:

means for receiving document data from a facsimile apparatus;

memory control means for controlling the external memory apparatus such that the document data received by said receiving means is stored in the external memory apparatus;

display control means for controlling a display such that the document data stored in the external memory apparatus is displayed on the display;

means for designating an icon displayed on the display; and means for updating a portion of the document data displayed on the display in response to a designation by said designation mean.

24. An apparatus according to claim 23, further comprising means for instructing the display to display the document data stored in the external memory apparatus.

25. An apparatus according to claim 24, further comprising designating means including a transparent touch panel arranged on a front surface of a display screen of the display for designating command icons displayed on the display.

26. An apparatus according to claim 23, further comprising means for printing the document data stored in the external memory apparatus.

27. An apparatus according to claim 26, further comprising print instructing means for sending a printing instruction to said printing means.

28. An apparatus according to claim 27, wherein said print instructing means comprises a transparent touch panel arranged on a front surface of a display screen of the display for designating command icons displayed on the display.

29. An apparatus according to claim 23, further comprising means for transmitting the document data stored in the external memory apparatus to a desired destination.

30. An apparatus according to claim 23, further comprising designating means including a transparent touch panel arranged on a front surface of a display screen of the display, said touch panel being arranged to specify command icons for various editing operations, the command icons being displayed on the display.

31. An apparatus according to claim 23, further comprising means for managing individual received document data stored in the external memory apparatus.

* * * * *

UNITED STATES PATENT AND TRADEMARK OFFICE
CERTIFICATE OF CORRECTION

PATENT NO. : 5,321,802

DATED : June 14, 1994

INVENTOR(S) : YOJI FURUYA, ET AL.

It is certified that error appears in the above-identified patent and that said Letters Patent is hereby corrected as shown below:

<u>ON THE TITLE PAGE</u>

At [57] ABSTRACT, line 6, "memory. Icons" should read --memory and icons--.

<u>COLUMN 3</u>

Line 16, "function" should read --function 20--.
Line 22, "29,;" should read --29,--.

<u>COLUMN 8</u>

Line 60, "However" should read --However,--.

<u>COLUMN 10</u>

Line 52, "to designate" should read --for designating--.

<u>COLUMN 12</u>

Line 30, "mean." should read --means--.

Signed and Sealed this

Twenty-eight Day of February, 1995

Attest:

BRUCE LEHMAN

*Attesting Officer*     *Commissioner of Patents and Trademarks*